(12) United States Patent
Farmer

(10) Patent No.: US 6,779,268 B1
(45) Date of Patent: Aug. 24, 2004

(54) OUTER AND INNER COWL-WIRE WRAP TO ONE PIECE COWL CONVERSION

(75) Inventor: Gilbert Farmer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 10/436,842

(22) Filed: May 13, 2003

(51) Int. Cl.[7] .............................................. B23P 15/00
(52) U.S. Cl. .............................. 29/890.01; 29/402.08; 60/752
(58) Field of Search .................. 29/890.01, 402.01, 29/402.03, 402.08, 426.4, 426.1, 428, 889.1; 60/752, 554

(56) References Cited

U.S. PATENT DOCUMENTS

| | | | |
|---|---|---|---|
| 5,974,805 A | 11/1999 | Allen | |
| 6,148,600 A | 11/2000 | Farmer et al. | |
| 6,205,763 B1 | 3/2001 | Farmer et al. | |
| 6,286,302 B1 | 9/2001 | Farmer et al. | |
| 6,345,441 B1 | 2/2002 | Farmer et al. | |
| 6,513,331 B1 * | 2/2003 | Brown et al. | 60/754 |
| 6,553,767 B2 | 4/2003 | Farmer et al. | |
| 6,568,079 B2 * | 5/2003 | Farmer et al. | 29/890.01 |
| 6,629,415 B2 * | 10/2003 | Howard et al. | 60/752 |
| 6,651,437 B2 * | 11/2003 | Farmer et al. | 60/752 |
| 6,655,146 B2 * | 12/2003 | Kutter et al. | 60/752 |
| 6,655,147 B2 * | 12/2003 | Farmer et al. | 60/752 |
| 6,655,149 B2 * | 12/2003 | Farmer et al. | 60/754 |

* cited by examiner

Primary Examiner—I Cuda Rosenbaum
(74) Attorney, Agent, or Firm—Nathan D. Herkamp; Armstrong Teasdale LLP; Robert B. Reeser, III

(57) ABSTRACT

A method facilitates replacing a portion of a gas turbine engine combustor. The combustor includes a combustor liner and a wire-wrapped cowl assembly that includes an inner cowl and an outer cowl. The method comprises cutting through the wire-wrapped cowl assembly upstream from fastener openings used to couple the inner and outer cowls to the combustor liner, removing a portion of the cowl assembly from the combustor, and coupling a replacement cowl to the portion of the existing cowl assembly that is downstream from the cut, wherein the replacement cowl includes an inner annular portion, an outer annular portion, and a plurality of circumferentially-spaced radial ligaments extending therebetween.

19 Claims, 4 Drawing Sheets

OUTER AND INNER COWL-WIRE WRAP TO ONE PIECE COWL CONVERSION

BACKGROUND OF THE INVENTION

This invention relates generally to gas turbine engine, and more particularly, to methods for replacing combustor liner panels used with gas turbine engines.

A turbine engine includes a compressor for compressing air which is mixed with a fuel and channeled to a combustor wherein the mixture is ignited within a combustion chamber for generating hot combustion gases. At least some known combustors include a dome assembly, a cowl assembly, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowl assembly, and extend downstream from the cowl assembly to define the combustion chamber.

At least some known cowl assemblies are two piece assemblies that include an inner and an outer cowl. Because the inner and outer cowls are coupled to the liners, each cowl may be subjected to mechanical stresses and vibratory stresses induced from the combustor. In addition, either cowl may be subjected to different stresses than the other respective cowl. Over time, continued exposure to such stresses may cause one, or both, cowls to deteriorate, and limit the useful life thereof.

To facilitate reducing the effects of stresses that may be induced to the cowl assemblies, at least some known two-piece cowl assemblies include a wire-wrapped portion wherein each cowl is formed with a lip at the leading edge thereof. More specifically, the cowl lip is formed by curling or wrapping the cowl around a damper wire. However, during operation a thermal mismatch may occur between the cowl body and the wire. Over time, continued operation with the thermal mismatch may cause the cowl to unwrap from around the wire such that a gap is created between the wire and the cowl. When vibratory loading is induced to the cowls, the gap may permit the cowl to shake against the wire, which over time may result in damage and deterioration of the two-piece cowl assembly. Current repair methods for two-piece cowl assemblies include removing the deteriorated inner and/or outer cowl and replacing the deteriorated cowl with replacement cowl that includes the wire-wrapped portion. However, because the cowl assembly is coupled to the liner and the dome assembly, often the entire combustor must be disassembled for either cowl to be replaced. Furthermore, when the fasteners are removed from the cowl assembly and dome assembly, precise dimensional relations between the components may be altered and as a result, special tooling may be required during reassembly. Thus, replacing a wire-wrapped cowl may be a time-consuming and expensive process.

BRIEF SUMMARY OF THE INVENTION

In one aspect, a method for replacing a portion of a gas turbine engine combustor is provided. The combustor includes a combustor liner and a wire-wrapped cowl assembly that includes an inner cowl and an outer cowl. The method comprises cutting through the wire-wrapped cowl assembly upstream from fastener openings used to couple the inner and outer cowls to the combustor liner, removing a portion of the cowl assembly from the combustor, and coupling a replacement cowl to the portion of the existing cowl assembly that is downstream from the cut, wherein the replacement cowl includes an inner annular portion, an outer annular portion, and a plurality of circumferentially-spaced radial ligaments extending therebetween.

In another aspect, a method for replacing a portion of a deteriorated cowl assembly within a gas turbine engine combustor is provided. The deteriorated cowl assembly includes an inner surface, an outer surface, and a wire-wrapped portion. The method comprises cutting substantially radially through the deteriorated cowl assembly between the outer and inner surfaces of the deteriorated cowl assembly, removing the wire-wrapped portion of the deteriorated cowl assembly that is upstream from the cut extended through the cowl assembly, and coupling a replacement cowl onto the combustor to replace the portion of the deteriorated cowl assembly removed from the combustor, wherein the replacement cowl includes an inner annular portion and an outer annular portion that is substantially concentric with respect to the annular inner portion.

DETAILED DESCRIPTION OF THE INVENTION

Figure 1:
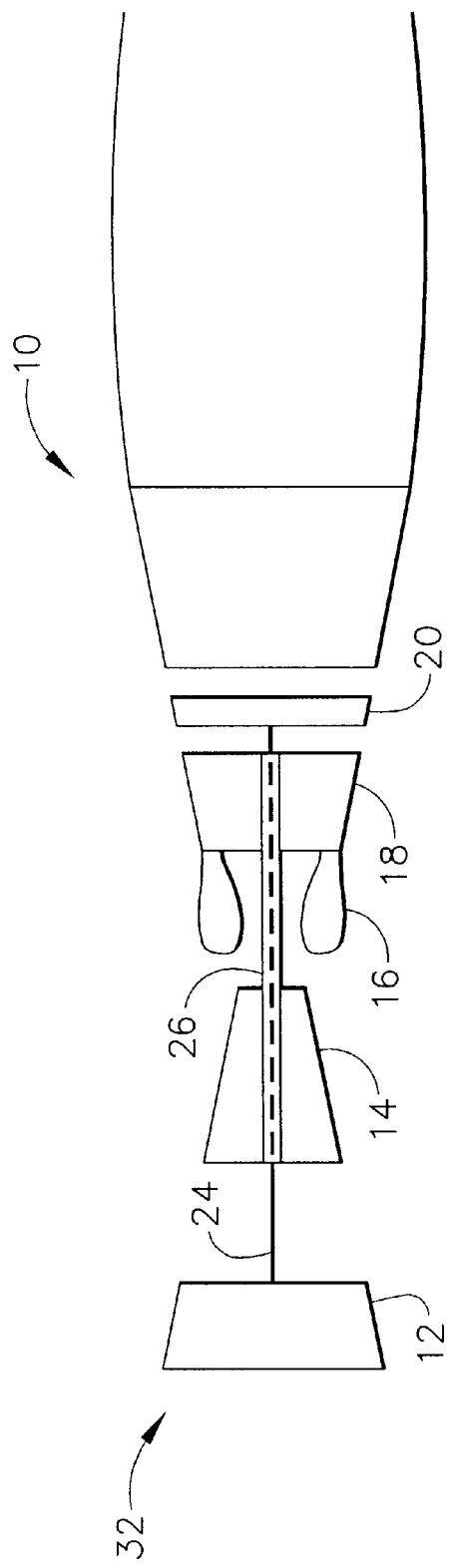
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is an LM 6000 engine commercially available from General Electric Aircraft Engines, Cincinnati, Ohio. In another embodiment, gas turbine engine 10 is a CF engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
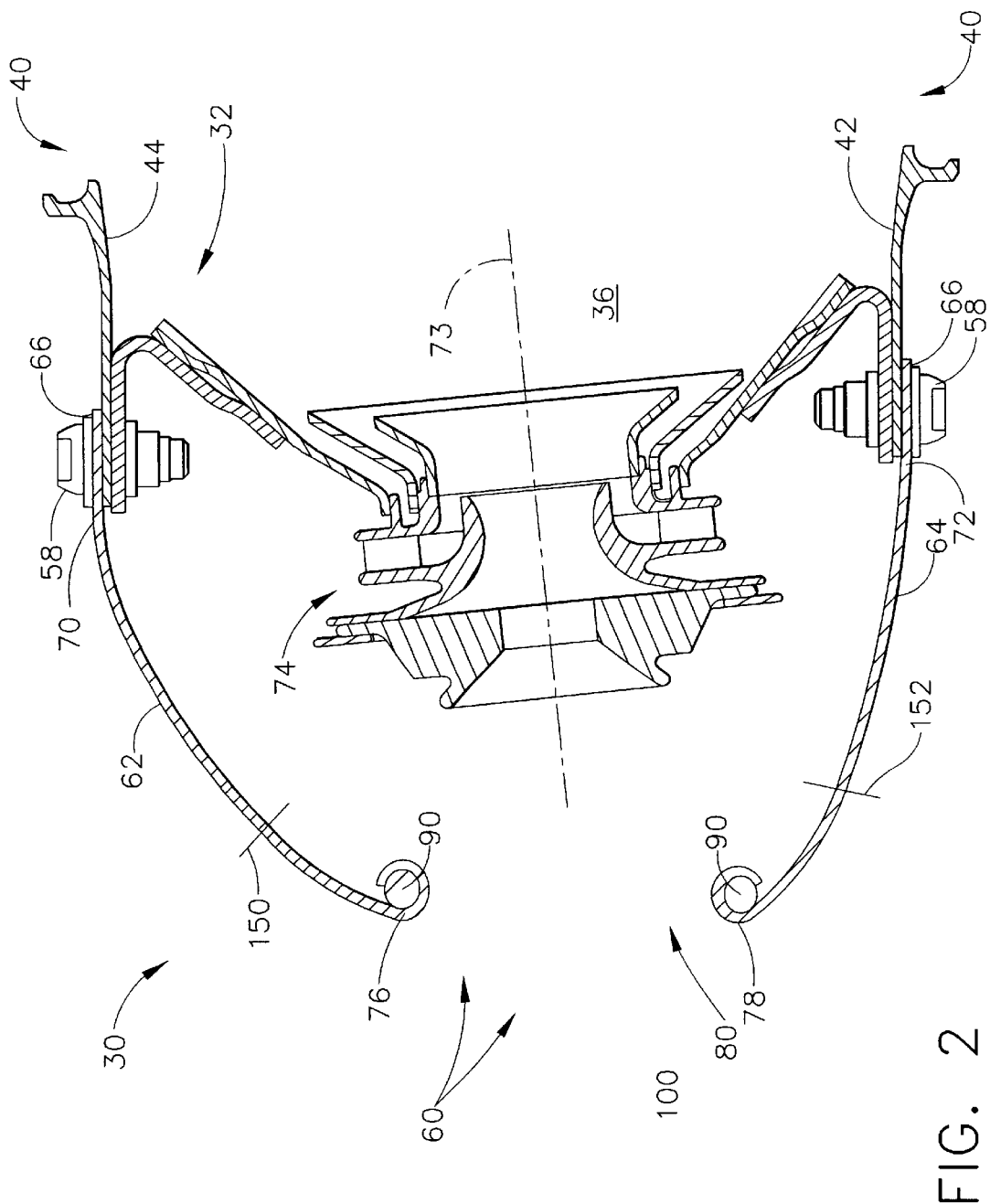
FIG. 2 is a partial cross-sectional view of an exemplary known combustor that may be used with the gas turbine engine shown in FIG. 1.

FIG. 2 is a partial cross-sectional view of an exemplary known combustor 30. Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 defined within combustor 30 to form an air-fuel mixture that is ignited downstream of the fuel injector Combustion zone 36 is formed by annular, radially outer and radially inner supporting members (not shown) and combustor liners 40. Combustor liners 40 shield the outer and inner supporting members from the heat generated within combustion zone 36 and includes an inner liner 42 and an outer liner 44. Liners 42 and 44 define combustion zone 36. Combustion zone 36 extends from dome assembly 32 downstream to a turbine nozzle (not shown). Outer liner 44 and inner liner 42 are each coupled to dome assembly 32 by a plurality of circumferentially-spaced fasteners 58.

A cowl assembly 60 is also coupled to dome assembly 32 by fasteners 58. Specifically, cowl assembly 60 includes an outer cowl 62 and an inner cowl 64 that each include a plurality of circumferentially-spaced openings 66. Openings 66 extend through cowls 62 and 64 adjacent a respective trailing edge 70 and 72 of each cowl 62 and 64. Each opening 66 is sized to receive a respective fastener 58 therethrough. Cowls 62 and 64 extend upstream from dome assembly 32 and are aerodynamically contoured towards a center axis 73 of an air/fuel mixer assembly 74 coupled to dome assembly 32. Specifically, a leading edge 76 and 78 of each respective cowl 62 and 64 define a generally annular opening 80 wherein compressed air is directed therethrough towards combustion chamber 30. More specifically, each leading edge 76 and 78 is rolled aftward at least partially around a continuous solid core wire 90. Wire 90 facilitates damping vibrations induced to cowls 62 and 64.

During operation, cowls 62 and 64 are exposed to compressor discharge flow and may be impacted by chaotic perturbations in the impinging compressed air flow channeled into combustor 30. As the air flow contacts cowls 62 and 64, mechanical vibration may be induced into cowl assembly 60. More specifically, vibration resulting from these normal operating conditions may cause high cycle fatigue of cowls 62 and 64. A torsional frictional force is induced between wire 90 and cowls 62 and 64 to facilitate damping vibrational stresses induced to cowl assembly 60. However, over time, continued exposure to such stresses may cause wire-damped or wire-wrapped cowls 62 and 64 to wear such that a gap is formed between wire 90 and cowls 62 and 64. More specifically, continued contact through the gap between cowl assembly 60 and wire 90 may frictionally thin wire 90 and deteriorate cowls 62 and 64.

Figure 3:
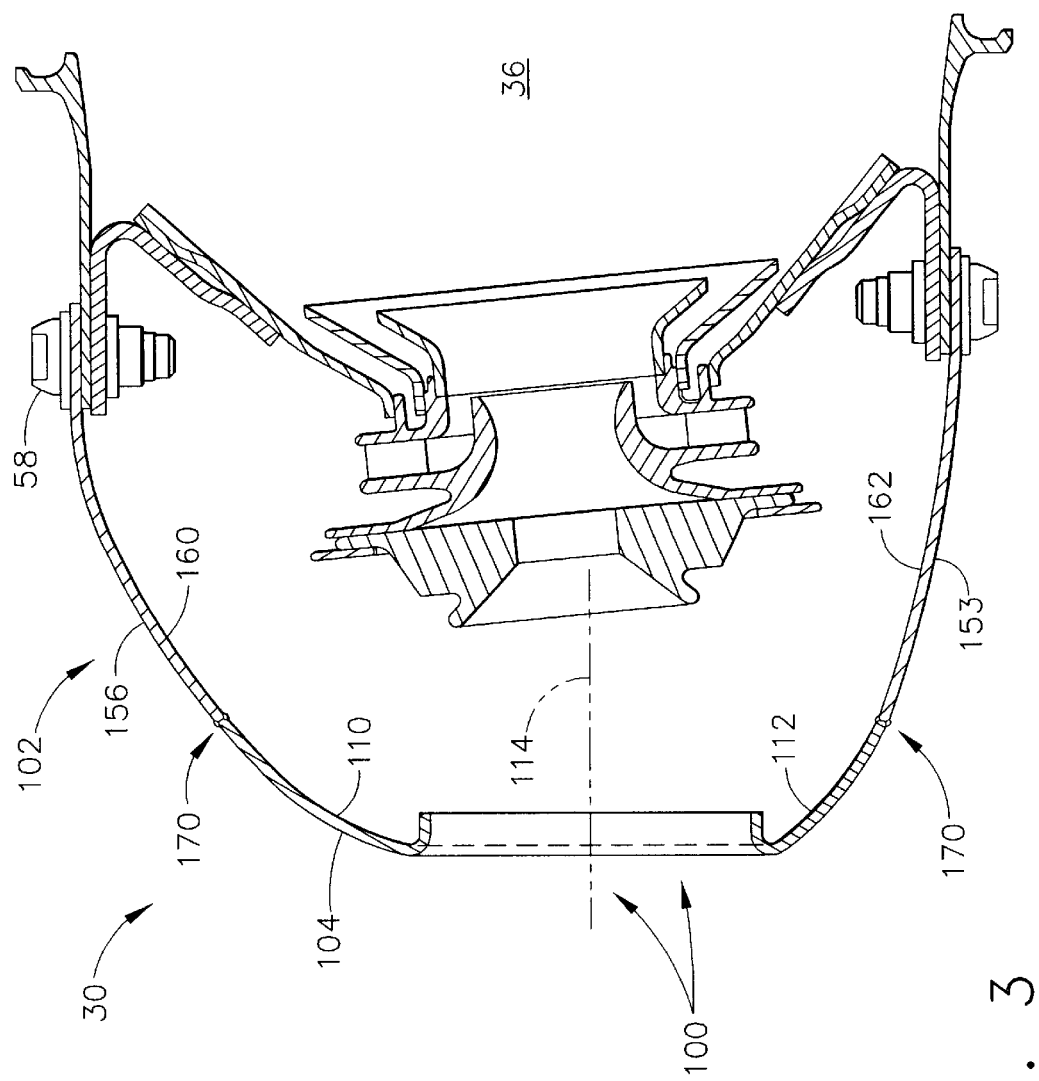
FIG. 3 is a cross-sectional view of the combustor shown in FIG. 2 and including a cowl assembly repaired in accordance with the methods described herein.
Figure 4:
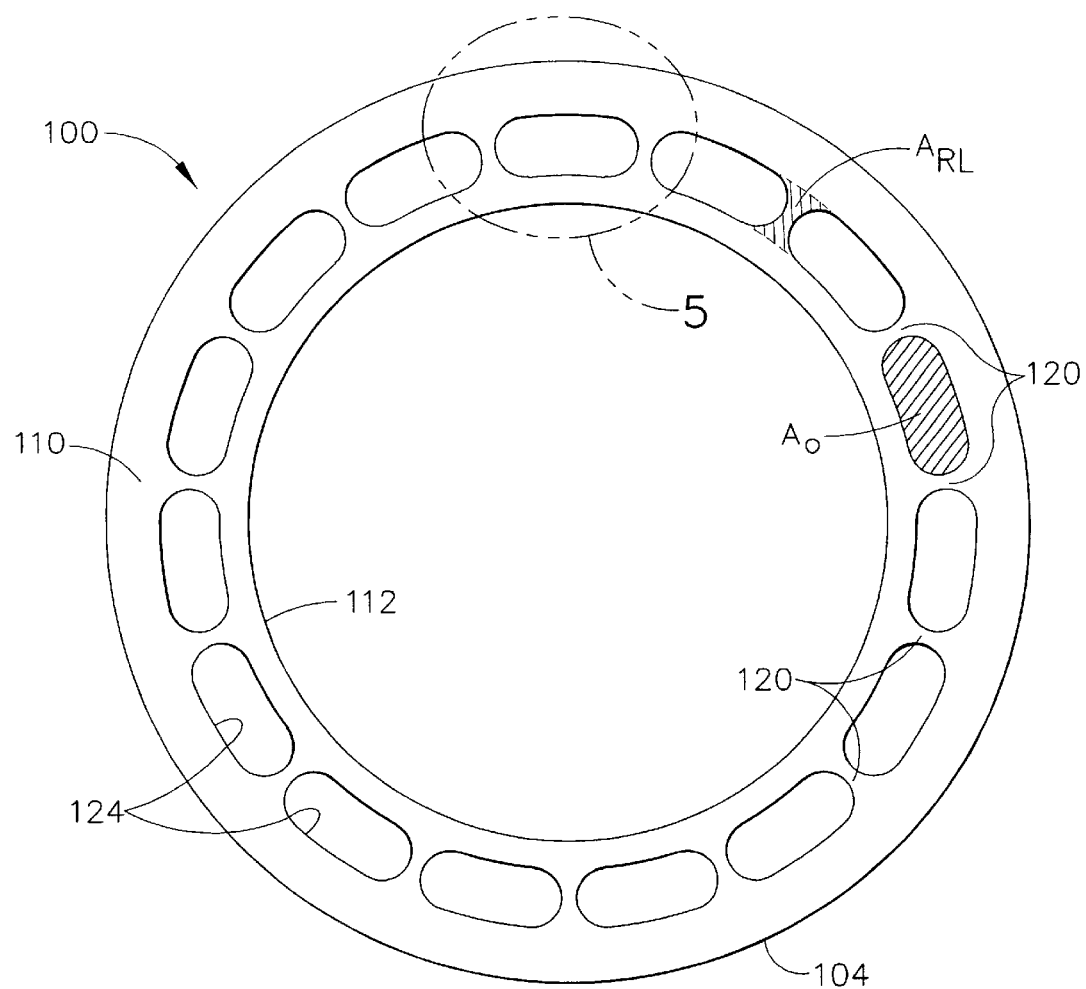
FIG. 4 is a forward looking aft view of the cowl assembly shown in FIG. 3.
Figure 5:
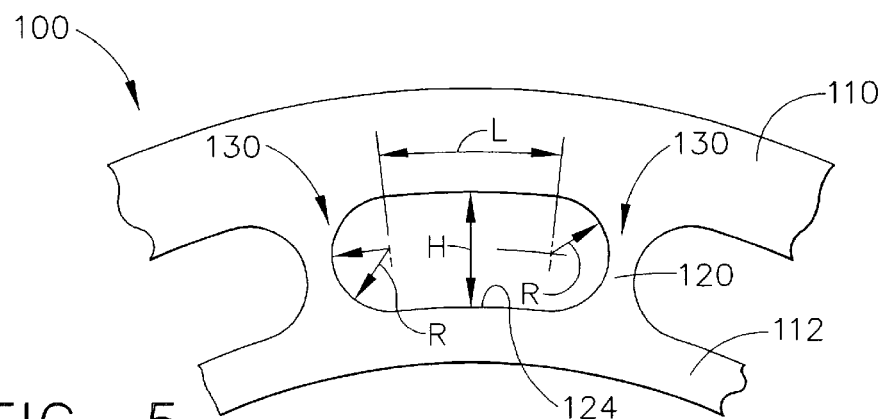
FIG. 5 is a partial aft looking forward view of a portion of the cowl assembly shown in FIG. 4.

FIG. 3 is a cross-sectional view of combustor 30 including a cowl assembly 100 repaired and/or retrofitted in accordance with the methods described herein. FIG. 4 is a forward looking aft view of cowl assembly 100. FIG. 5 is a partial aft looking forward view of a portion of cowl assembly 100 taken along area 5—5 (shown in FIG. 4). Cowl assembly 100 includes a portion 102 of cowl assembly 60 (shown in FIG. 2) and includes a replacement cowl 104. Cowl 104 is a one-piece cowl and is coupled, as described in more detail below, to cowl assembly portion 102, such that cowl 104 extends upstream from cowl assembly portion 102.

Cowl 104 includes an outer annular portion 110 and an inner annular portion 112 that are substantially concentric about a central cowl axis 114 extending through cowl assembly 100. Cowl portions 110 and 112 are aerodynamically contoured relative to central cowl axis 114. A plurality of radial members or ligaments 120 are circumferentially-spaced about cowl 104. More specifically, ligaments 120 extend between outer and inner annular portions 110 and 112 such that a plurality of openings 124 are defined between outer and inner annular portions 110 and 112, and between circumferentially adjacent ligaments 120.

Each radial ligament 120 is variably sized to have a cross-sectional area $A_{RL}$ that facilitates providing a pre-desired structural support to cowl 104 and facilitates cowl assembly 100 operating at a pre-determined natural frequency that facilitates preventing cowl assembly 100 from failing in high cycle fatigue. More specifically, ligament areas $A_{RL}$ facilitate reducing high cycle fatigue (HCF) stress induced to cowl 104. Similarly, each opening 124 is sized with a pre-determined cross-sectional area $A_O$ that enables each opening 124 to receive at least one fuel nozzle (not shown) therethrough. For example, in the exemplary embodiment, cowl 104 includes fifteen circumferentially-spaced openings 124.

Furthermore, it should be understood that radial ligaments 120 and openings 124 are sized and configured with respect to each other to receive a pre-desired airflow therethrough during engine operations. More specifically, in the exemplary embodiment, ligament area $A_{RL}$ and opening area $A_O$ are interrelated such that a ratio $A_{RL}/A_O$ between ligament area $A_{RL}$ and opening area $A_O$ is betweeen approximately 2 and 7.

In addition, in the exemplary embodiment, openings 124 are also sized with a predetermined radial height H and are rounded at each circumferential end 130. More specifically, each end 130 is formed with a pre-determined radius R. In the exemplary embodiment, a ratio H/R of opening radial height H to the end radius R is preferably between approximately 2 and 2.5.

During operation, as atomized fuel is injecting into combustion zone 36 and ignited, heat is generated within zone 36. Cowls 62 and 64 (shown in FIG. 2) are exposed to compressor discharge flow and may be impacted by chaotic perturbations in the impinging compressed air flow channeled into combustor 30. As the air flow contacts cowls 62 and 64, mechanical vibration may be induced into cowl assembly 60. More specifically, vibration resulting from these normal operating conditions may cause high cycle fatigue of cowls 62 and 64. A torsional frictional force induced between wire 90 (shown in FIG. 2) and cowls 62 and 64 facilitates damping vibrational stresses induced to cowl assembly 60. However, over time, continued exposure to such stresses may cause wire-damped or wire-wrapped cowls 62 and 64 to wear such that a gap may form between wire 90 and cowls 62 and 64. More specifically, continued contact through the gap between cowl assembly 60 and wire 90 may frictionally thin wire 90 and deteriorate cowls 62 and 64.

Deteriorated regions of combustor cowl 60 may be removed and replaced using the methods described herein. More specifically, the deteriorated wire-wrapped portion of cowl 60 may be removed and replaced using the methods described herein. If a field returned engine, such as engine 10, indicates that combustor cowl 60 includes a damaged or deteriorated wire-wrapped portion, a radial cut (illustrated as 150 in FIG. 2) is made through outer cowl 62, and a similar cut (illustrated as 152 in FIG. 2) is made through inner cowl 64 to enable deteriorated portions of outer and inner cowls 62 and 64, respectively, specifically, wire-wrapped portions of cowls 62 and 64, to be removed from combustor 30. More specifically, as shown in FIG. 2, each cut 150 and 152 extends radially through each respective cowl 62 and 64 between an exterior surface 156 and 158 to an interior surface 160 and 162 of each respective cowl 62 and 64. Accordingly, when deteriorated portions of cowl 62 and 64 have been removed, cowl assembly portion 102 remains. In one embodiment, fasteners 58 are loosened from cowl assembly 60, and cowl assembly 60 is removed from combustor 30 prior to cuts 150 and 152 being formed.

Replacement cowl 104 is then coupled to cowl assembly 60 to form cowl assembly 100. More specifically, when coupled to cowl assembly 60, an annular coupling joint 170 is formed between cowl 104 and cowl assembly portion 102, and cowl 104 extends upstream from cowl assembly portion 102. In one embodiment, cowl 104 is coupled to cowl assembly portion 102 with a laser welding process. In another embodiment, cowl 104 is coupled to cowl assembly portion 102 with a brazing process. In yet another embodiment, cowl 104 is coupled to cowl assembly portion 102 using any suitable coupling method that enables cowl assembly 100 to function as described herein, such as but not limited to electron beam welding, and tungsten inert gas, TIG, welding.

When coupled within combustor 30 by fasteners 58, cowl assembly 100 performs the function of properly directing and regulating the flow of compressed air to combustion chamber 36 (shown in FIG. 2). However, cowl 104 provides structural support to cowl assembly 100 such that one-piece cowl assembly 100 is more durable than cowl assembly 60. Furthermore, cowl 104 facilitates reducing stresses induced to cowl assembly 100 while preventing high cycle fatigue.

Because deteriorated wire-wrapped cowls are replaced using the methods described herein, combustors 30 are returned to service using a replacement/retrofit process that facilitates improved savings in comparison to removing and replacing entire cowl assemblies. Furthermore, because the replacement cowl is shaped to be substantially similar to the originally installed cowl assembly, aerodynamic performance and combustor performance are not adversely impacted by the replacement cowls.

The above-described combustor liner replacement method is cost-effective and highly reliable. The methods include the steps of removing deteriorated wire-wrapped outer and inner cowls from the combustor, and replacing such cowls with a one-piece cowl assembly. The replacement cowl assembly facilitates reducing stresses induced to the cowl assembly, such that the useful life of the combustor is facilitated to be extended. As a result, methods are provided which enable deteriorated wire-wrapped mulit-piece combustor cowls to be removed and replaced in a cost-effective and reliable manner.

Exemplary embodiments of combustors and cowl replacement methods are described above in detail. The combustors and replacement cowl assemblies are not limited to the specific embodiments described herein, but rather, components of each assembly may be utilized independently and separately from other components described herein. Furthermore, each replacement method can also be used in combination with other combustor components and replacement cowl assembly configurations. Moreover, the methods described herein, are not limited to the specific combustor embodiments described herein.

While the invention has been described in terms of various specific embodiments, those skilled in the art will recognize that the invention can be practiced with modification within the spirit and scope of the claims.

What is claimed is:

1. A method for replacing a portion of a gas turbine engine combustor, the combustor including a combustor liner and a wire-wrapped cowl assembly that includes an inner cowl and an outer cowl, said method comprising:
   cutting through the wire-wrapped cowl assembly upstream from fastener openings used to couple the inner and outer cowls to the combustor liner;
   removing a portion of the cowl assembly from the combustor; and
   coupling a replacement cowl to the portion of the existing cowl assembly that is downstream from the cut, wherein the replacement cowl includes an inner annular portion, an outer annular portion, and a plurality of circumferentially-spaced radial ligaments extending therebetween.

2. A method in accordance with claim 1 wherein coupling a replacement cowl to the portion of the existing cowl assembly that is downstream from the cut comprises using at least one of laser welding and brazing to couple the replacement cowl to the existing cowl assembly.

3. A method in accordance with claim 1 wherein coupling a replacement cowl to the portion of the existing cowl assembly that is downstream from the cut comprises selecting a number of circumferentially-spaced radial ligaments to facilitate a pre-desired natural frequency during engine operations.

4. A method in accordance with claim 1 wherein coupling a replacement cowl to the portion of the existing cowl assembly that is downstream from the cut comprises selecting a number of circumferentially-spaced radial ligaments to facilitate reducing high cycle fatigue induced to the combustor.

5. A method in accordance with claim 1 wherein coupling a replacement cowl to the portion of the existing cowl assembly that is downstream from the cut comprises spacing adjacent radial ligaments at a pre-desired length to enable at least one fuel nozzle to be inserted between adjacent radial ligaments.

6. A method in accordance with claim 1 wherein cutting through the wire-wrapped cowl assembly comprises cutting through the wire-wrapped cowl assembly such that all of the wire-wrapped portion of the existing combustor cowl assembly is removable from the combustor.

7. A method for replacing a portion of a gas turbine engine combustor, the combustor including a combustor liner and a wire-wrapped cowl assembly that includes an inner cowl and an outer cowl, said method comprising:
   uncoupling the cowl assembly from the combustor liner;
   cutting between an outer surface and an inner surface of the outer cowl, wherein the cut is formed upstream from a plurality of fastener openings formed within the outer cowl for coupling the outer cowl to the combustor liner;
   cutting between an outer surface and an inner surface of the inner cowl wherein the cut is formed upstream from a plurality of fastener openings formed within the inner cowl for coupling the outer cowl to the combustor liner;
   removing the portion of the cowl assembly that is upstream from the cuts formed;
   coupling a replacement cowl to the portion of the existing cowl assembly that is downstream from the cuts formed, wherein the replacement cowl includes an inner annular portion, an outer annular portion, and a plurality of circumferentially-spaced radial ligaments extending therebetween; and
   coupling the repaired cowl assembly to the combustor.

8. A method in accordance with claim 7 wherein removing the portion of the cowl assembly that is upstream from the cuts formed comprises removing the wire-wrapped portion of the cowl assembly from the combustor.

9. A method in accordance with claim 8 wherein coupling a replacement cowl to the portion of the existing cowl assembly that is downstream from the cuts formed comprises coupling the replacement cowl assembly to the existing cowl assembly using at least one of a laser welding process and a brazing process.

10. A method in accordance with claim 8 wherein coupling a replacement cowl to the portion of the existing cowl assembly that is downstream from the cuts formed comprises coupling a replacement cowl to the existing cowl assembly that includes a variably selected amount of circumferentially-spaced radial ligaments to facilitate a pre-desired natural frequency during engine operations.

11. A method in accordance with claim 8 wherein coupling a replacement cowl to the portion of the existing cowl assembly that is downstream from the cuts formed comprises coupling a replacement cowl to the existing cowl assembly to facilitate reducing high cycle fatigue induced to the combustor.

12. A method in accordance with claim 8 further comprising inserting at least one fuel nozzle into an opening defined between adjacent circumferentially-spaced radial ligaments.

13. A method for replacing a portion of a deteriorated cowl assembly within a gas turbine engine combustor, the deteriorated cowl assembly including an inner surface, an outer surface, and a wire-wrapped portion, said method comprising:

cutting substantially radially through the deteriorated cowl assembly between the outer and inner surfaces of the deteriorated cowl assembly;

removing the wire-wrapped portion of the deteriorated cowl assembly that is upstream from the cut extended through the cowl assembly; and coupling a replacement cowl onto the combustor to replace the portion of the deteriorated cowl assembly removed from the combustor, wherein the replacement cowl includes an inner annular portion and an outer annular portion that is substantially concentric with respect to the annular inner portion.

14. A method in accordance with claim 13 wherein the combustor also includes a liner extending downstream from the cowl assembly, said method further comprising uncoupling the deteriorated cowl from the combustor by removing at least one fastener that is used to couple the cowl assembly to the liner.

15. A method in accordance with claim 14 wherein coupling a replacement cowl onto the combustor to replace the portion of the deteriorated cowl assembly removed from the combustor comprises:

using a laser welding process to couple the replacement cowl to the existing cowl assembly; and coupling the cowl assembly to the combustor liner using at least one fastener.

16. A method in accordance with claim 14 wherein coupling a replacement cowl onto the combustor to replace the portion of the deteriorated cowl assembly removed from the combustor comprises:

brazing the replacement cowl to the existing cowl assembly; and coupling the cowl assembly to the combustor liner using at least one fastener.

17. A method in accordance with claim 14 wherein coupling a replacement cowl onto the combustor to replace the portion of the deteriorated cowl assembly removed from the combustor further comprises coupling a replacement cowl onto the combustor that includes a plurality of circumferentially-spaced radial ligaments extending between the inner and outer annular portions.

18. A method in accordance with claim 17 wherein coupling a replacement cowl onto the combustor that includes a plurality of circumferentially-spaced radial ligaments further comprises coupling the replacement cowl to the combustor to facilitate a pre-desired natural frequency during engine operations.

19. A method in accordance with claim 17 wherein coupling a replacement cowl onto the combustor that includes a plurality of circumferentially-spaced radial ligaments further comprises coupling the replacement cowl to the combustor to facilitate reducing high cycle fatigue induced to the combustor.

* * * * *